United States Patent [19]

Kim et al.

[11] Patent Number: 5,302,459

[45] Date of Patent: Apr. 12, 1994

[54] METHOD FOR PREPARATION OF POLYESTER FILMS WITH GOOD RELEASE AND SLIP PROPERTIES

[75] Inventors: Kwang-Tae Kim, Seoul; Ik-Sung Kim; Choon-Young Kim, both of Suwon, all of Rep. of Korea

[73] Assignee: Cheil Synthetics Inc., Kyungsan, Rep. of Korea

[21] Appl. No.: 920,710

[22] Filed: Jul. 28, 1992

[30] Foreign Application Priority Data

Aug. 1, 1991 [KR] Rep. of Korea .................. 91-13315

[51] Int. Cl.$^5$ .................. B32B 9/04; B29C 55/12
[52] U.S. Cl. .................. 428/447; 264/130; 264/134; 264/210.7; 264/290.2; 264/331.19; 428/483
[58] Field of Search .................. 264/130, 134, 210.7, 264/331.19, 288.4, 290.2, 235.8; 427/171, 172, 173; 428/447, 483

[56] References Cited

U.S. PATENT DOCUMENTS

| | | | |
|---|---|---|---|
| 4,132,552 | 2/1979 | Van Paesschen et al. | 427/171 |
| 4,391,767 | 7/1983 | Pears | 264/210.7 |
| 4,782,041 | 11/1988 | Vanier | 428/195 |
| 4,851,166 | 7/1989 | Kendall | 427/173 |
| 4,853,418 | 8/1989 | Hanada et al. | 521/154 |
| 4,866,026 | 9/1989 | Henzel et al. | 428/195 |
| 4,892,860 | 1/1990 | Vanier | 428/195 |
| 4,970,559 | 11/1990 | Miyabayashi | 118/60 |
| 5,095,001 | 3/1992 | Miles et al. | 428/412 |
| 5,158,924 | 10/1992 | Konagaya et al. | 428/195 |

FOREIGN PATENT DOCUMENTS 62-204939 9/1987 Japan .................. 264/130

*Primary Examiner*—Jay H. Woo
*Assistant Examiner*—Duane S. Smith
*Attorney, Agent, or Firm*—Nikaido, Marmelstein, Murray & Oram

[57] ABSTRACT

A method for preparation of a biaxially stretched polyester film with good slip and release properties comprising coating an acrylic resin-based aqueous resin compound, which is derived from adding an amino-modified silicone compound having the structural formula (1), a waxy additive and inert inorganic particles to an acrylic resin, on at least one surface of a mono-axially stretched polyester film, drying the polyester film coated with the aqueous resin compound, mono-axially stretching the dried polyester film in a direction perpendicular to that of the previous mono-axial stretching and heat-treating the stretched polyester film:

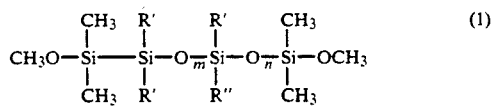

wherein R' is a hydroxyl group, a methyl or an ethyl; R" is a hydrogen carbide which has 0 to 10 carbon atoms and to which NH or $NH_2$ is bonded; m is an integer in the range of 5 to 1,000; n is an integer in the range of 100 to 20,000; and $n/(m+n)=0.5$.

12 Claims, No Drawings

METHOD FOR PREPARATION OF POLYESTER FILMS WITH GOOD RELEASE AND SLIP PROPERTIES

BACKGROUND OF THE INVENTION

1. Field of the Invention

The present invention relates in general to a method for preparation of polyester films, and more particularly to a method for preparing biaxially stretched polyester films with high levelness and excellent release and slip properties by applying thereon a surface coating layer.

2. Description of the Prior Art

As is well known to those skilled in the art, known polyester films, particularly biaxially stretched polyester films, have excellent intrinsic properties, such as optical, mechanical and electrical properties, dimensional stability, heat resistance and chemical resistance. Thus, they have recently been widely used for graphic art films, photo films, magnetic tape films, electrical insulation films, packing films, etc..

However, there occur several problems in processes, such as a printing process, a laminating process, a coating process and the like, for preparation of the several types of polyester film products using the known polyester film. For example, scratches may be easily generated on the film surface due to rolls with which the polyester film comes into close contact during the processes. Furthermore in this case, the higher the processing velocity increases the more scratches are generated. In addition, the hot and humid atmosphere of the processes for preparing the film product detrimentally affects the slip property of the polyester film and this introduces several problems in working performances, for example, run ability of the polyester film and wind ability of the film product, of the polyester film.

On the other hand, when the known polyester film is used for a release material in a fiberglass reinforced plastics (FRP) molding process, the release property of the release material is reduced at the interface between the FRP resin and the release material. Furthermore, the FRP curing conditions influence the release effect of the release material. Therefore, the release material may partially adhere to the FRP resin and, moreover, the sheet molding resin may adhere to the release material as it is heated.

As a result, the known polyester films used for the release films in the FRP forming process have a problem in that they, particularly when they are very thin, may easily tear and/or be delaminated during the mechanical taking-up process thereof, thus causing the forming product to be damaged and, in this respect, to be inevitably reduced in its quality.

Furthermore, this problem of the known polyester film particularly happens when one polyester film is repeatedly used several times. Thus, it is desired to provide a polyester film which is capable of maintaining its own slip and release properties irrespective of repeated use.

To impart excellent slip and release properties to the polyester film, it is preferred to apply at least one surface of the polyester film, a silicone resin as is well known to the art.

Conventionally, the silicone resin is applied to the polyester film surface and is then thermally cured thereon; in the presence of a curing agent. However, this silicone resin intrinsically has an excellent release property so that it has deficient adhesion with respect to the base film. Additionally, if the silicone resin coating layer is strongly rubbed, it may be partially delaminated so as to make the coated product cloudy and, moreover, it may be relatively easily scaled off. Here, the tackiness of the silicone resin layer, with respect to the base film, is gradually reduced as time goes by and the reduction of the tackiness of the silicone resin layer is accelerated when the interface between the silicone resin layer and the base film surface is exposed to the atmosphere.

SUMMARY OF THE INVENTION

It is, therefore, an object of the present invention to provide a method for preparation of a polyester film having high levelness and excellent release and slip properties in which the above problems can be overcome and which comprises coating a monoaxially stretched polyester resin film with an acrylic resin-based aqueous resin compound, which is derived from adding an amino-modified silicone composition, a waxy additive and inert inorganic particles to an acrylic resin, on at least one surface of said mono-axially stretched polyester film, drying the polyester film coated with the aqueous resin compound, mono-axially stretching the dried, coated polyester film in a direction perpendicular to that of the previous mono-axial stretching and heat-treating the stretched polyester film.

DETAILED DESCRIPTION OF THE PREFERRED EMBODIMENTS

Preferably, the acrylic resin used in the acrylic resin composition of the present invention is a hard thermosetting emulsion resin, a thermoplastic water-dispersible resin or mixtures thereof. Here, each of the emulsion and water-dispersible resins comprises alkyl methacrylate and alkyl acrylate and/or has a glass transition temperature more than 40° C.

In accordance with the improvement of this invention, the acrylic resin preferably comprises 40 to 90 molar % of alkyl methacrylate and/or alkyl acrylate and 10 to 60 molar % of vinyl monomer capable of copolymerizing with the alkyl methacrylate and/or the alkyl acrylate and has a functional group thereon. When the acrylic resin contains the alkyl methacrylate and/or the alkyl acrylate in a proportion of not less than 40 molar %, it appears has excellent blocking resistance and excellent coating layer forming property. On the other hand, when the acrylic resin contains the alkyl methacrylate and/or alkyl acrylate not more than 90 molar %, it easily permits a compound, which has a specified functional group to be added thereto, thus causing the resultant acrylic resin to be easily dissolved in water and water-dispersed. Furthermore, such a dissolved and water-dispersed state of the acrylic resin is stably maintained for a long time. In addition, such an acrylic resin exhibits excellent water resistance, chemical resistance and coating layer strength.

Also, the vinyl monomer, which has the functional group thereon and is capable of copolymerizing with the alkyl methacrylate and alkyl acrylate, causes the resultant acrylic resin to have good hydrophilic properties and a high degree of water dispersibility and improves the adhere on between the polyester film base and the coating layer of the acrylic resin composition.

The alkyl group of the alkyl acrylate and the alkyl methacrylate is selected from methyl, ethyl, n-propyl, n-butyl, isopropyl, isobutyl, lauryl and etc..

The functional group is selected from a carboxyl group or a salt thereof, a sulfonic acid group or a salt thereof, an amide group or an alkylolated amide, a hydroxide, an epoxide and etc..

In view of the slip property, the coating layer strength, the water resistance and the chemical resistance, it is preferred to use a hard acrylic resin having a glass transition temperature not less than 40° C.

The amino-modified silicone compound used in this invention has the structural formula:

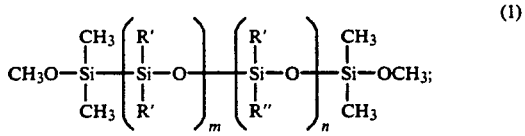

wherein,

R' is a hydroxyl group, a methyl or an ethyl group,
R" is NH, $NH_2$ or a hydrocarbon substituted with an NH or $NH_2$ and which has up to 10 carbon atoms
m is an integer in the range of 5 to 1,000,
n is an integer in the range of 100 to 20,000, and n/(m+n)=0.5.

As described above, the amino-modified silicone compound has to have NH or $NH_2$ in its structural formula. The NH or $NH_2$ of the silicone compound reacts with the functional group, such as the carboxyl group, the sulfonic group, the hydroxyl group, the alkylol group, the epoxy group and etc., which has been copolymerized into the acrylic resin and causes the silicone compound to be prevented from being delaminated from the polyester film base.

To achieve good result of this invention, it is preferred to use an amino-modified silicone compound which is maintained in an emulsion or aqueous solution state and has a viscosity in the range of 5 to 500 cps. at a temperature of 25° C. If the viscosity is lower than the above range, the slip and release properties of the resultant polyester film is detrimentally affected, while if the viscosity is higher than the above range, the compatibility between the amino-modified silicone compound and the acrylic resin is degraded.

On the other hand, the waxy additive is selected from polyolefin waxes having a plurality of structural formulas, preferably a polyethylene wax and a polypropylene wax. Here, the molecular weight of the used waxy additive is not particularly limited, but is preferably ranged from about 500 to about 50,000.

The inert inorganic particle is selected from titanium oxide, silicone oxide, calcium carbonate, kaoline, alumina, barium sulfate, zirconium, mica, calcium phosphate and etc., and has an average particle size in the range of about 20 to 1,000 nm, preferably in the range of about 50 to 300 nm.

In addition, it is preferred to mix required agents, such as a surface active agent, an antifoaming agent, a thickener, an antioxidant, an ultraviolet absorber, a pH controller and etc. to the aqueous resin compound used in this invention.

The polyester film which is used has a surface roughness not more than 0.03 μm, preferably not more than 0.01 μm, on the basis of its center line roughness measuring value, and has a turbidity not more than 5.0, preferably not more than 1.0. Such a level, transparent polyester film is prepared by adding no organic or inorganic particle to a polyester resin or by adding a very small amount of the particles to the polyester resin. In addition, the film thickness is in the range of about 30 to 500 μm.

In this invention, the aqueous resin composition is coated on at least one surface of the polyester film base by a conventional coating method prior to accomplishment of the crystal orientation of the polyester film base. In other words, the aqueous resin compound is applied to the polyester film base just after mono-axial stretching of the melted and extruded film base, followed by drying in a conventional drying process. Thereafter, the polyester film is stretched in a direction perpendicular to the prior stretching direction and in turn heat treated.

This aqueous resin composition has a solids content not more than 20% by weight, preferably not more than 8% by weight. Also, the viscosity of the aqueous resin composition is not more than about 100 cps., preferably not more than about 20 cps..

As described above, the coating method for coating the above aqueous resin compound on the polyester film base is selected from the conventional coating methods, such as direct roll coating, reverse roll coating, direct gravure coating, reverse gravure coating, bar coating and the like. Here, the coating amount of the aqueous resin compound is in the range of 0.001 g. to 1 g. per $ft^2$ of the final product, preferably in the range of 0.005 g. to 0.2 g. per $ft^2$ of the final product.

The polyester film products prepared by the method of this invention exhibit excellent slip and release properties so that they can be wide used for micro films, labels and various types of laminate products.

In this invention, the characteristics of the polyester film products are measured as follows:

1. Coefficient of Friction

The coefficients of statical friction $\mu_S$ and the coefficients of kinetic friction $\mu_K$ of the final products were measured using a slippery measuring instrument, which was manufactured by Dongyang Tester Co. of Korea, under a load of 200 g and in accordance with ASTM D1894.

2. Release Property

A) Pink lacquer method:

To measure the release properties of the polyester film products, each polyester film product, on which the aqueous resin compound had been coated, was coated with a pink lacquer as a testing resin, followed by drying using a conventional drier. The film product was then formed with a plurality of lattice slits spaced apart from each other by a distance of 1 mm. A scotch tape (Model No. 610 manufactured and sold by 3M Co.) as an adhesive tape then strongly adhered to the lattice slit surface of the film product with no air bag formed therebetween. Thereafter, the scotch tape was suddenly took off the film surface and the number of lattices, each having the area of 1×1 $mm^2$ and being delaminated from the polyester film surface due to the aforementioned sudden taking off of the tape, was calculated in terms of percentage.

B) Printing ink method:

To measure the release properties of the polyester film products, each polyester film product, on which the aqueous resin compound had been coated, was coated with an aqueous gravure ink as a testing ink and dried by a conventional drier. Thereafter, the same procedure as that of the aforementioned pink lacquer method was repeated. The number of lattices was calculated in terms of percentage.

3. Surface Consistency (Center Line Average Roughness)

The average surface consistencies of the polyester film products were measured using a consistometer SE-3H (manufactured and sold by KOSAKA Laboratory of Japan) from hanged charts under the condition of 2 μm of radius of the needle, 30 mg of load, 20,000 magnifications, 0.08 mm of cut-off value.

The following examples and comparative examples are merely intended to illustrate the present invention in further detail and should by no means be considered to limitative of the scope of the invention.

EXAMPLE 1

Acrylic resin (A): a thermosetting acrylic emulsion resin which comprised 50:50 molar ratio of alkyl acrylate and alkyl methacrylate and was mixed with an anionic surface active agent having a glass transition temperature of 50° C.

Acrylic resin (B): a thermoplastic acrylic water-dispersible resin which comprised alkyl acrylate and alkyl methacrylate of molar ratio in the range of 50:50 to 99:1 and was mixed with an anionic surface active agent having a glass transition temperature of 100° C.

Polyethylene terephthalate, which had an inherent viscosity of 0.65 when it was measured at 25° C. diesolvedin of orthochlorophenol, was melted and extruded, thereafter, the extrudate was rapidly cooled on a drum maintained at a temperature of 40° C. so as to produce a non-orientated film having a thickness of 650 μm. The resultant film was then mono-axially stretched, using metal rolls which was maintained at a temperature of 95° C., to 3.6 times in the running direction of the film. Thereafter, the stretched film was coated with an aqueous resin composition derived from mixing 65% by weight of the acrylic resin (A), 29% by weight of an amino-modified silicone compound, 3% by weight of a waxy additive and 3% by weight of the inert inorganic particles, followed by drying. The dried film was then stretched to 3.6 times in a direction perpendicular to the running direction of the film at a temperature of 105° C. and heat-treated at a temperature of 220° C., thereby preparing a biaxially stretched polyester film product having 50 μm thickness and 0.02 g/m² of coating amount of the coating layer. The characteristics of the polyester film product are given in Table 1.

EXAMPLE 2

The procedure of Example 1 was repeated, substituting 68% by weight of the acrylic resin (A) for 65% by weight of the resin (A) and using no waxy additive. The characteristics of the biaxially stretched polyester film product are given in Table 1.

EXAMPLE 3

The procedure of Example 1 was repeated, substituting 68% by weight of the acrylic resin (B) for 65% by weight of the acrylic resin (A), 25% by weight of the same amino-modified silicone compound for 29% by weight of the compound, 3.5% by weight of the waxy additive for 3% by weight of the wax and 3.5% by weight of the inert inorganic particles for 3% by weight of the particles, respectively. The characteristics of the biaxially stretched polyester film product are given in Table 1.

EXAMPLE 4

The procedure of Example 1 was repeated, substituting 60% by weight of the acrylic resin (B) for 65% by weight of the acrylic resin (A) and 34% by weight of the same amino-modified silicone compound for 29% by weight of the compound, respectively. The characteristics of the biaxially stretched polyester film product are given in Table 1.

EXAMPLE 5

The procedure of Example 1 was repeated, substituting 78% by weight of the acrylic resin (B) for 65% by weight of the acrylic resin (A), 15% by weight of the same amino-modified silicone compound for 29% by weight of the compound and 4% by weight of the inert inorganic particles for 3% by weight of the particles, respectively. The characteristics of the biaxially stretched polyester film product are given in Table 1.

EXAMPLE 6

The procedure of Example 1 was repeated, substituting 13% by weight of the acrylic resin (A) and 52% by weight of the acrylic resin (B) for 65% by weight of the acrylic resin (A), 26% by weight of the same amino-modified silicone compound for 29% by weight of the compound, 5% by weight of the waxy additive for 3% by weight of the wax and 4% by weight of the inert inorganic particles for 3% by weight of the particles, respectively. The characteristics of the biaxially stretched polyester film product are given in Table 1.

EXAMPLE 7

The procedure of Example 1 was repeated, substituting 33% by weight of the acrylic resin (A) and 33% by weight of the acrylic resin (B) for 65% by weight of the acrylic resin (A), 26% by weight of the same amino-modified silicone compound for 29% by weight of the compound, 4% by weight of the waxy additive for 3% by weight of the wax and 4% by weight of the inert inorganic particles for 3% by weight of the particles, respectively. The characteristics of the biaxially stretched polyester film product are given in Table 1.

EXAMPLE 8

The procedure of Example 1 was repeated, substituting 85% by weight of the acrylic resin (B) for 65% by weight of the acrylic resin (A), 7% by weight of the same amino-modified silicone compound for 29% by weight of the compound, 4% by weight of the waxy additive for 3% by weight of the wax and 4% by weight of the inert inorganic particles for 3% by weight of the particles, respectively. The characteristics of the biaxially stretched polyester film product are given in Table 1.

EXAMPLE 9

The procedure of Example 1 was repeated, substituting 89% by weight of the acrylic resin (B) for 65% by weight of the acrylic resin (A), 2% by weight of the same amino-modified silicone compound for 29% by weight of the compound, 4.5% by weight of the waxy additive for 3% by weight of the wax and 4.5% by weight of the inert inorganic particles for 3% by weight of the particles, respectively. The characteristics of the biaxially stretched polyester film product are given in Table 1.

EXAMPLE 10

The procedure of Example 1 was repeated, substituting 68% by weight of the acrylic resin (B) for 65% by weight of the acrylic resin (A) and 29% by weight of the amino-modified silicone compound for 29% by weight of the compound, respectively, and using no waxy additive. The characteristics of the biaxially streteched polyester film product are given in Table 1.

COMPARATIVE EXAMPLE 1

The procedure of Example 1 was repeated but there was no coating of aqueous resin composition on the polyester film. The characteristics of the biaxially stretched polyester film product are given in Table 1.

COMPARATIVE EXAMPLE 2

The procedure of Comparative Example 1 was repeated, substituting an aqueous resin compound composition comprising 100% by weight of the acrylic resin (A) for the aqueous resin compound composition. The characteristics of the biaxially stretched polyester film product are given in Table 1.

COMPARATIVE EXAMPLE 3

The procedure of Comparative Example 2 was repeated, substituting an aqueous resin composition comprising 100% by weight of the acrylic resin (B) for the aqueous resin composition in Comparative Example 2. The characteristics of the biaxially stretched polyester film product are given in Table 1.

COMPARATIVE EXAMPLE 4

The procedure of Comparative Example 2 was repeated, substituting an aqueous resin composition comprising 50% by weight of the acrylic resin (A) and 50% by weight of the acrylic resin (B) for the aqueous resin composition of Comparative Example 2. The characteristics of the biaxially stretched polyester film product are given in Table 1.

TABLE 1

| Content Section | Coefficient* $\mu_s$ | $\mu_k$ | Release Property Pink Lacquer | Printing Ink | Surface Consistency |
| --- | --- | --- | --- | --- | --- |
| Exam. 1 | 0.28 | 0.23 | 100 | 100 | 0.007 |
| Exam. 2 | 0.41 | 0.36 | 100 | 100 | 0.007 |
| Exam. 3 | 0.25 | 0.22 | 60 | 95 | 0.007 |
| Exam. 4 | 0.27 | 0.20 | 100 | 100 | 0.007 |
| Exam. 5 | 0.38 | 0.29 | 40 | 80 | 0.008 |
| Exam. 6 | 0.27 | 0.25 | 100 | 100 | 0.007 |
| Exam. 7 | 0.27 | 0.24 | 100 | 100 | 0.007 |
| Exam. 8 | 0.47 | 0.38 | 0 | 20 | 0.007 |
| Exam. 9 | 0.50 | 0.43 | 0 | 3 | 0.008 |
| Exam. 10 | 0.44 | 0.37 | 100 | 100 | 0.007 |
| Comp. 1 | 1.01 | 1.01 | 0 | 0 | 0.007 |
| Comp. 2 | 0.56 | 0.47 | 0 | 0 | 0.009 |
| Comp. 3 | 0.59 | 0.48 | 0 | 0 | 0.009 |
| Comp. 4 | 0.57 | 0.48 | 0 | 0 | 0.009 |

*Coefficient of friction

The present invention has been described in detail with particular reference to preferred embodiments thereof, but it will be understood that variations and modifications can be effected within the spirit and scope of the invention.

What is claimed is:

1. A method for preparation of a biaxially stretched polyester film with good slip and release properties comprising the steps of:

forming an acrylic resin-based aqueous composition by combining:

an amino-modified silicone compound having the structural formula:

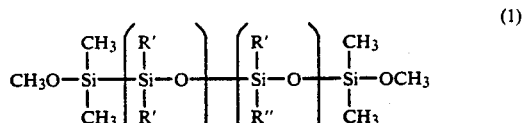

wherein

R' is at least one member selected from the group consisting of hydroxyl, methyl and ethyl, R" is at least one of an amine and an amine substituted hydrocarbon containing up to 10 carbon atoms, m is an integer in the range of 5 to 1,000, n is an integer in the range of 100 to 20,000, $n/(m+n)=0.5$, polyethylene wax, inert inorganic particles, an acrylic resin, and additional resin component which is reactive with both said acrylic resin and said silicone compound;

mono-axially stretching a polyester film;

coating said composition on at least one surface of said film;

drying the polyester film coated with said aqueous resin composition;

mono-axially stretching said dried polyester film in a direction perpendicular to that of the previous mono-axial stretching; and heat-treating the stretched polyester film to produce a coated polyester film having improved slip and release properties.

2. The method according to claim 1, wherein said acrylic resin is selected from at least one member selected from the group consisting of a hard thermosetting emulsion resin, a thermoplastic water-dispersible resin and mixtures thereof, and wherein said thermosetting emulsion resin and thermoplastic water-dispersible resin comprise at least one of an alkyl methacrylate and an alkyl acrylate which have a glass transition temperature of not less than 40° C., respectively, and is combinable with said silicone resin to form said coating.

3. The method according to claim 1, wherein said amino-modified silicone compound is present in a proportion of 5 to 75% by weight of the solid content of said acrylic resin composition.

4. The method according to claim 1 wherein said additional resin component comprises a monomer having a vinyl group which is reactive with said acrylic resin, and a further functional group which is capable of reacting with said silicone.

5. The method according to claim 1 wherein said acrylic resin comprises about 40 to 90 molar percent and said additional resin comprises about 10 to 60 molar percent of the combination of said acrylic resin and said additional resin.

6. The method as claimed in claim 4 wherein said further functional group is at least one member selected from the group consisting of carboxyl, carboxyl salt, sulfonic acid, sulfonic acid salt, amide, alkoxylated amide, and epoxide.

7. The method according to claim 1 wherein said acrylic resin composition comprises the reaction product of:

an acrylic resin selected from the group consisting of alkyl acrylates and alkyl methacrylates having glass transition temperatures of at least about 40° C.;

an amino-modified silicone resin having the structural formula (1):

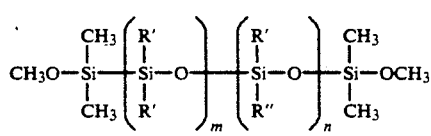

(1)

wherein

R' is at least one member selected from the group consisting of hydroxyl, methyl, and ethyl, R" is at least one of an amine and an amine substituted hydrocarbon containing up to 10 carbon atoms, m is an integer in the range of 5 to 1,000, n is an integer in the range of 100 to 20,000, and n/(m+n)=0.5; and a vinyl resin containing a functional group which is reactive with said silicone resin.

8. A coated polyester film material comprising a biaxially oriented polyester film substrate and a coating thereon, which provides improved release and slip properties, which coating comprises: polyethylene wax; particles of an inorganic material; and an acrylic resin composition comprising the reaction product of an acrylic resin, an amine modified silicone resin having the following formula:

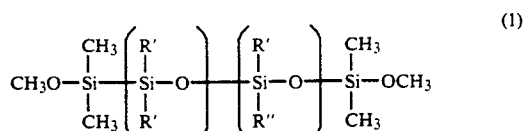

(1)

wherein

R' is at least one member selected from the group consisting of hydroxyl, methyl, and ethyl, R" is at least one of an amine and an amine substituted hydrocarbon containing up to 10 carbon atoms, m is an integer in the range of 5 to 1,000, n is an integer in the range of 100 to 20,000, and n/(m+n)=0.5 and a vinyl monomer, which has been reacted with said acrylic resin through said vinyl group, and which contained a functional group which has been reacted with said silicone.

9. A coated polyester film as claimed in claim 8 wherein said acrylic resin has a glass transition temperature of at least 40° C., and is at least one of a hard thermosetting emulsion resin and a thermoplastic water-dispersible resin, and wherein said acrylic resin is at least one of an alkyl acrylate and an alkyl methacrylate.

10. A coated polyester film as claimed in claim 8, wherein said acrylic resin comprises 10 to 90% by weight of said acrylic resin composition and said silicone resin comprises 5 to 75% by weight of said acrylic resin composition.

11. A coated polyester film as claimed in claim 8, wherein said acrylic resin comprises 40 to 90% by mole and said vinyl monomer comprises 10 to 60% by mole of the combination of said acrylic resin and said vinyl monomer.

12. A coated polyester resin film as claimed in claim 8 wherein said additional monomer has further functional group thereon which is reactive with said silicone and is at least one member selected from the group consisting of carboxyl, carboxyl salt, sulfonic acid, sulfonic acid salt, amide, alkoxylated amide, and epoxide.

* * * * *